United States Patent
Gao et al.

(10) Patent No.: US 11,011,999 B2
(45) Date of Patent: *May 18, 2021

(54) POWER SUPPLY SYSTEM AND POWER SUPPLY METHOD

(71) Applicant: Huawei Technologies Co., Ltd., Shenzhen (CN)

(72) Inventors: Yongbing Gao, Shanghai (CN); Yanfeng Li, Shanghai (CN); Xun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/881,796

(22) Filed: May 22, 2020

(65) Prior Publication Data

US 2020/0287476 A1    Sep. 10, 2020

Related U.S. Application Data

(63) Continuation of application No. 16/561,248, filed on Sep. 5, 2019, now Pat. No. 10,666,162, which is a continuation of application No. PCT/CN2018/077274, filed on Feb. 26, 2018.

(30) Foreign Application Priority Data

Mar. 6, 2017    (CN) .......................... 201710128678.1

(51) Int. Cl.
H02M 7/537    (2006.01)
H02S 40/32    (2014.01)
H02J 3/38    (2006.01)

(52) U.S. Cl.
CPC ............... *H02M 7/537* (2013.01); *H02J 3/38* (2013.01); *H02J 3/383* (2013.01); *H02S 40/32* (2014.12)

(58) Field of Classification Search
CPC .. H02M 7/42; H02M 7/48; H02M 2007/4822; H02M 7/515; H02M 7/53; H02M 7/537; H02S 40/22; H02S 40/30; H02S 40/32; H02J 3/38; H02J 3/383; Y02E 10/56
See application file for complete search history.

(56) References Cited

U.S. PATENT DOCUMENTS 7,990,743 B2    8/2011  Walling et al.
10,666,162 B2*  5/2020  Gao etal. .............. H02M 7/537
2016/0268890 A1* 9/2016  Ayai et al. .............. H02M 3/04
(Continued)

FOREIGN PATENT DOCUMENTS

CN    103326398 A    9/2013
CN    104065285 A    9/2014
(Continued)

*Primary Examiner* — Matthew V Nguyen
(74) *Attorney, Agent, or Firm* — Conley Rose, P.C.

(57) ABSTRACT

A power supply system includes at least one inverter, at least one cell string, and a transformer, where an input end of the at least one inverter is connected to an output end of the at least one cell string, an output end of the at least one inverter is connected to an input end of the transformer, and an output end of the transformer is configured to output a power supply voltage. The output end of the at least one inverter is connected to an output end of an inverter unit.

20 Claims, 4 Drawing Sheets

(56) References Cited

U.S. PATENT DOCUMENTS

| | | |
|---|---|---|
| 2018/0083571 A1 | 3/2018 | Xu et al. |
| 2019/0097576 A1 | 3/2019 | Park et al. |
| 2019/0214917 A1 | 7/2019 | Pfeiffer |
| 2019/0238088 A1 | 8/2019 | Zhuang et al. |
| 2020/0021113 A1 | 1/2020 | Chen et al. |

FOREIGN PATENT DOCUMENTS

| | | |
|---|---|---|
| CN | 104467018 A | 3/2015 |
| CN | 104506130 A | 4/2015 |
| CN | 104901618 A | 9/2015 |
| CN | 106033895 A | 10/2016 |
| CN | 106160651 A | 11/2016 |
| CN | 106849167 A | 6/2017 |
| EP | 3576245 A1 | 12/2019 |
| JP | 2017011956 A | 1/2017 |

* cited by examiner

┌─────────────────────────────────────────────────┐
│ A voltage controller obtains a first voltage, where the first │
│ voltage is a voltage to earth of at least one cell panel string │ ⟵ S710
│ connected to an input end of at least one inverter │
└─────────────────────────────────────────────────┘
                         │
┌─────────────────────────────────────────────────┐
│ The voltage controller adjusts a bus voltage of an inverter │
│ unit and an input and/or output voltage of a DC converter │
│ based on the first voltage, so that the voltage controller │
│ adjusts a voltage to earth of a negative electrode of the at │ ⟵ S720
│ least one cell panel string to 0 volts or higher or adjusts a │
│ voltage to earth of a positive electrode of the at least one cell │
│ panel string to 0 volts or lower │
└─────────────────────────────────────────────────┘

FIG. 5

POWER SUPPLY SYSTEM AND POWER SUPPLY METHOD

CROSS-REFERENCE TO RELATED APPLICATIONS

This application is a continuation of U.S. patent application Ser. No. 16/561,248, filed on Sep. 5, 2019, which is a continuation application of International Application No. PCT/CN2018/077274, filed on Feb. 26, 2018, which claims priority to Chinese Patent Application No. 201710128678.1, filed on Mar. 6, 2017. All of the aforementioned patent applications are hereby incorporated by reference in their entireties.

TECHNICAL FIELD

This application relates to the photovoltaic field, and further, to a power supply system and a power supply method.

BACKGROUND

Potential induced degradation (PID) a photovoltaic cell panel means that when the photovoltaic cell panel is used, if there is a bias voltage between the cell panel and earth PE, output power degradation occurs in the cell panel after a period of time.

Various mechanisms result in such degradation. For example, under an effect of the foregoing voltage, ion migration occurs in a packaging material of a cell of a component and a material of an upper surface layer and a lower surface layer of the component, hot carrier occurs in the cell, an active layer of the cell is reduced due to redistribution of charges, and a related circuit is corroded. These mechanisms resulting in degradation are referred to as potential induced degradation, polarization, electrolytic corrosion, and electrochemical corrosion. In recent years, PID has become one of important factors contributing to complaints of foreign buyers against quality of components from China. When PID is serious, power of a component may be degraded by at least 50%. Consequently, power output of an entire power station is affected.

To resolve PID degradation, in other approaches, a virtual neutral (N) point is constructed using an inverter circuit, a positive electrode or a negative electrode of a bus of the inverter circuit is grounded, and a bus voltage is adjusted, to implement a bias voltage to earth of a positive electrode or a negative electrode of the cell panel string, thereby resolving PID degradation. In the method, because a minimum of a half-bus voltage is a half of an uncontrolled rectified voltage of a power grid voltage, a compensation range is narrow. In addition, at a moment when the bus is grounded, the cell panel string has parasitic capacitance to earth, generating a surge current. Consequently, an inverter is shut down due to an excessively large leaked current, affecting a power generation capacity of the entire power station.

SUMMARY

This application provides a power supply system and a power supply method. In the power supply system and the power supply method, a voltage to earth output by a voltage controller may be continuously adjusted starting from 0, to resolve problems in an existing solution that a voltage is adjusted within a narrow range and a surge current is generated at a moment in which a bus is grounded, and increase a compensated power density with a small loss. In addition, PID degradation is effectively resolved.

According to a first aspect, a power supply system is provided. The power supply system includes at least one cell panel string, at least one inverter, a transformer, and a voltage controller, where an input end of the at least one inverter is connected to an output end of the at least one cell string, an output end of the at least one inverter is connected to an input end of the transformer, and an output end of the transformer is configured to output a power supply voltage; the voltage controller includes a first sampling unit, a control unit connected to the first sampling unit, and an inverter unit connected to the first sampling unit, where the first sampling unit is configured to sample a voltage and a current of the inverter unit; the output end of the at least one inverter is further connected to an output end of the inverter unit; and the voltage controller further includes a direct current (DC) converter configured to output a DC converted voltage; and a second sampling unit, connected to the control unit, and configured to sample a voltage and a current of the DC converter, where the control unit is further configured to adjust a bus voltage of the inverter unit and an input and/or output voltage of the DC converter such that a voltage to earth output by the voltage controller is continuously adjusted starting from 0.

In the power supply system in this embodiment of this application, by adjusting a bus voltage of the voltage controller and the input and/or output voltage of the DC converter, the voltage to earth of the voltage controller is adjusted starting from 0, and an adjustable dead zone ranging from 0 to a half of an uncontrolled rectified voltage of a power grid voltage is compensated such that a range for voltage compensation is increased.

With reference to the first aspect, in a first possible implementation of the first aspect, the voltage controller further includes a first communications unit configured to obtain a voltage to earth of the at least one cell panel string, where the control unit is further configured to adjust the bus voltage of the inverter unit and the input and/or output voltage of the DC converter based on the voltage to earth of the at least one cell panel string such that the voltage controller adjusts a voltage to earth of a negative electrode of the at least one cell panel string to 0 volts or higher or adjusts a voltage to earth of a positive electrode of the at least one cell panel string to 0 volts or lower.

In some possible implementations, the first communications unit is further configured to obtain the voltage to earth of the at least one cell panel string and a bus voltage of the at least one inverter, where the control unit is further configured to adjust the bus voltage of the inverter unit and the input and/or output voltage of the DC converter based on the voltage to earth of the at least one cell panel string and the bus voltage of the at least one inverter such that the voltage controller adjusts the voltage to earth of the negative electrode of the at least one cell panel string to 0 volts or higher or adjusts the voltage to earth of the positive electrode of the at least one cell panel string to 0 volts or lower.

In the power supply system in this embodiment of this application, a positive bus and a negative bus of the voltage controller are grounded using the DC converter, to adjust the voltage to earth of the cell panel string. In addition, by adjusting the input and/or output voltage of the DC converter and the bus voltage of the inverter unit, the voltage to earth of the negative electrode of the at least one cell panel string is adjusted to 0 volts or higher or the voltage to earth of the positive electrode of the at least one cell panel string is adjusted to 0 volts or lower.

With reference to the first possible implementation of the first aspect, in a second possible implementation of the first aspect, the voltage controller further includes a switching unit, connected to the DC converter and the inverter unit, and configured to switch adjustment of the voltage to earth of the positive electrode or the negative electrode of the at least one cell panel string, where the control unit is further configured to select, based on a type of the at least one cell panel string, a positive bus or a negative bus of the inverter unit to connect to the switching unit.

In the power supply system in this embodiment of this application, voltages to earth of positive electrodes or negative electrodes of different cell panel strings are adjusted such that the voltage controller adjusts the voltage to earth of the negative electrode of the at least one cell panel string to 0 volts or higher or adjusts the voltage to earth of at least one positive cell panel string to 0 volts or lower.

With reference to any one of the first aspect or the first to the second possible implementations of the first aspect, in a third possible implementation of the first aspect, the at least one inverter includes a third sampling unit, where the third sampling unit is configured to sample a voltage to earth value of a cell panel string connected to the input end of the at least one inverter, and the power supply system further includes a monitoring unit, connected to the at least one inverter and the voltage controller, and configured to receive the voltage to earth value sent by the at least one inverter and send the voltage to earth value to the voltage controller.

In some possible implementations, the third sampling unit is further configured to sample the voltage to earth value of the cell panel string connected to the input end of the at least one inverter and a bus voltage value of the at least one inverter; the monitoring unit is further configured to receive the voltage to earth value and the bus voltage value that are sent by the at least one inverter; and the monitoring unit is further configured to send the voltage to earth value and the bus voltage value to the voltage controller.

In the power supply system in this embodiment of this application, when a plurality of inverters work in parallel, provided that a voltage to earth control apparatus is added to an AC grid-tied end, the voltage to earth of the negative electrode of the at least one cell panel string input into each inverter can be adjusted to 0 volts or higher or the voltage to earth of the positive electrode of the at least one cell panel string input into each inverter can be adjusted to 0 volts or lower.

With reference to any one of the first aspect or the first to the third possible implementations of the first aspect, in a fourth possible implementation of the first aspect, the control unit is further configured to limit an output current and/or an input current of the voltage controller.

With reference to the fourth possible implementation of the first aspect, in a fifth possible implementation of the first aspect, the control unit is further configured to, if an output power of the at least one inverter is greater than or equal to a first power threshold, limit the output current of the voltage controller to be less than or equal to a first current threshold; or if an output power of the at least one inverter is less than a first power threshold, limit the output current of the voltage controller to be less than or equal to a second current threshold, where the first current threshold is greater than or equal to the second current threshold.

With reference to any one of the first aspect or the first to the fifth possible implementations of the first aspect, in a sixth possible implementation of the first aspect, the at least one inverter further includes a current protection unit configured to establish or end a connection between the at least one inverter and the transformer, where if a value of a current passing through the current protection unit is greater than or equal to a fault current threshold, the current protection unit ends the connection between the at least one inverter and the transformer.

In the power supply system in this embodiment of this application, the output current of the voltage controller is limited such that a fault ground current of a photovoltaic inverter system is limited, and a hazard of an electrical shock is reduced. In addition, the voltage controller may further work together with the current protection unit of the inverter, to further eliminate the hazard of the electrical shock.

With reference to any one of the first aspect or the first to the sixth possible implementations of the first aspect, in a seventh possible implementation of the first aspect, the DC converter is a switch mode power supply.

With reference to any one of the second to the seventh possible implementations of the first aspect, in an eighth possible implementation of the first aspect, the switching unit is at least one of a relay, a metal oxide semiconductor transistor, and an insulated gate bipolar transistor.

According to a second aspect, a power supply method is provided. The method includes obtaining, by the voltage controller, a first voltage, where the first voltage is a voltage to earth of the at least one cell panel string connected to an input end of the at least one inverter; and adjusting, by the voltage controller, a bus voltage of the inverter unit and an input and/or output voltage of the DC converter based on the first voltage such that the voltage controller adjusts a voltage to earth of a negative electrode of the at least one cell panel string to 0 volts or higher or adjusts a voltage to earth of a positive electrode of the at least one cell panel string to 0 volts or lower.

In some possible implementations, the voltage controller obtains the first voltage and a second voltage. The first voltage is the voltage to earth of the at least one cell panel string connected to the input end of the at least one inverter, and the second voltage is a bus voltage of the at least one inverter. The voltage controller adjusts the bus voltage of the inverter unit and the input and/or output voltage of the DC converter based on the first voltage and the second voltage such that the voltage controller adjusts the voltage to earth of the negative electrode of the at least one cell panel string to 0 volts or higher or adjusts the voltage to earth of the positive electrode of the at least one cell panel string to 0 volts or lower.

In the power supply method in this embodiment of this application, by adjusting a bus voltage of the voltage controller and the output voltage of the DC converter, the voltage to earth of the voltage controller is adjusted starting from 0, and an adjustable dead zone ranging from 0 to a half of an uncontrolled rectified voltage of a power grid voltage is compensated such that a range for voltage compensation is increased. In addition, by adjusting the input and/or output voltage of the DC converter and the bus voltage of the inverter unit, the voltage to earth of the negative electrode of the at least one cell panel string is adjusted to 0 volts or higher or the voltage to earth of the positive electrode of the at least one cell panel string is adjusted to 0 volts or lower.

With reference to the second aspect, in a first possible implementation of the second aspect, the method further includes switching, by the voltage controller, adjustment of the voltage to earth of the positive electrode or the negative electrode of the at least one cell panel string.

In some possible implementations, the method further includes selecting, by the control unit based on a type of the at least one cell panel string, a positive bus or a negative bus of the inverter unit to connect to the switching unit.

In the power supply method in this embodiment of this application, voltages to earth of positive electrodes or negative electrodes of different cell panel strings are adjusted such that the voltage controller adjusts the voltage to earth of the negative electrode of the at least one cell panel string to 0 volts or higher or adjusts the voltage to earth of at least one positive cell panel string to 0 volts or lower.

With reference to the second aspect or the first possible implementation of the second aspect, in a second possible implementation of the second aspect, the power supply method further includes obtaining, by the voltage controller, the voltage to earth of the negative electrode of the at least one cell panel string; and adjusting, by the voltage controller, the bus voltage of the inverter unit and the input and/or output voltage of the DC converter based on the voltage to earth of the negative electrode of the at least one cell panel string such that the voltage controller adjusts a voltage to earth value of the negative electrode of the at least one cell panel string to 0 volts or higher.

In some possible implementations, the power supply method further includes obtaining, by the voltage controller, the voltage to earth of the negative electrode of the at least one cell panel string and the bus voltage of the inverter connected to an output end of the at least one cell panel string; adjusting, by the voltage controller, the bus voltage of the inverter unit and the input and/or output voltage of the DC converter based on the voltage to earth of the negative electrode of the at least one cell panel string and the bus voltage of the inverter connected to the output end of the at least one cell panel string such that the voltage controller adjusts the voltage to earth value of the negative electrode of the at least one cell panel string to 0 volts or higher.

With reference to the second aspect or the first possible implementation of the second aspect, in a third possible implementation of the second aspect, the power supply method further includes obtaining, by the voltage controller, the voltage to earth of the positive electrode of the at least one cell panel string; and adjusting, by the voltage controller, the bus voltage of the inverter unit and the input and/or output voltage of the DC converter based on the voltage to earth of the positive electrode of the at least one cell panel string such that the voltage controller adjusts a voltage to earth value of the positive electrode of the at least one cell panel string to 0 volts or lower.

In some possible implementations, the power supply method further includes obtaining, by the voltage controller, the voltage to earth of the positive electrode of the at least one cell panel string and the bus voltage of the inverter connected to an output end of the at least one cell panel string; adjusting, by the voltage controller, the bus voltage of the inverter unit and the input and/or output voltage of the DC converter based on the voltage to earth of the positive electrode of the at least one cell panel string and the bus voltage of the inverter connected to the output end of the at least one cell panel string such that the voltage controller adjusts the voltage to earth value of the positive electrode of the at least one cell panel string to 0 volts or lower.

With reference to any one of the second aspect or the first to the third possible implementations of the second aspect, in a fourth possible implementation of the second aspect, the method further includes limiting, by the control unit, an output current and/or an input current of the voltage controller.

With reference to the fourth possible implementation of the second aspect, in a fifth possible implementation of the second aspect, the limiting an output current and/or an input current of the inverter unit includes, if an output power of the at least one inverter is greater than or equal to a first power threshold, limiting the output current of the voltage controller to be less than or equal to a first current threshold; or if an output power of the at least one inverter is less than a first power threshold, limiting the output current of the voltage controller to be less than or equal to a second current threshold, where the first current threshold is greater than or equal to the second current threshold.

With reference to any one of the second aspect or the first to the fifth possible implementations of the second aspect, the method further includes establishing or ending, by the current protection unit, a connection between the at least one inverter and the transformer, where if a value of a current passing through the current protection unit is greater than or equal to a fault current threshold, the current protection unit ends the connection between the at least one inverter and the transformer.

In the power supply method in this embodiment of this application, the output current of the voltage controller is limited such that a fault ground current of a photovoltaic inverter system is limited, and a hazard of an electrical shock is reduced. In addition, the voltage controller may further work together with the current protection unit of the inverter, to further eliminate the hazard of the electrical shock.

DESCRIPTION OF EMBODIMENTS

The following describes technical solutions of this application with reference to accompanying drawings.

Figure 1:
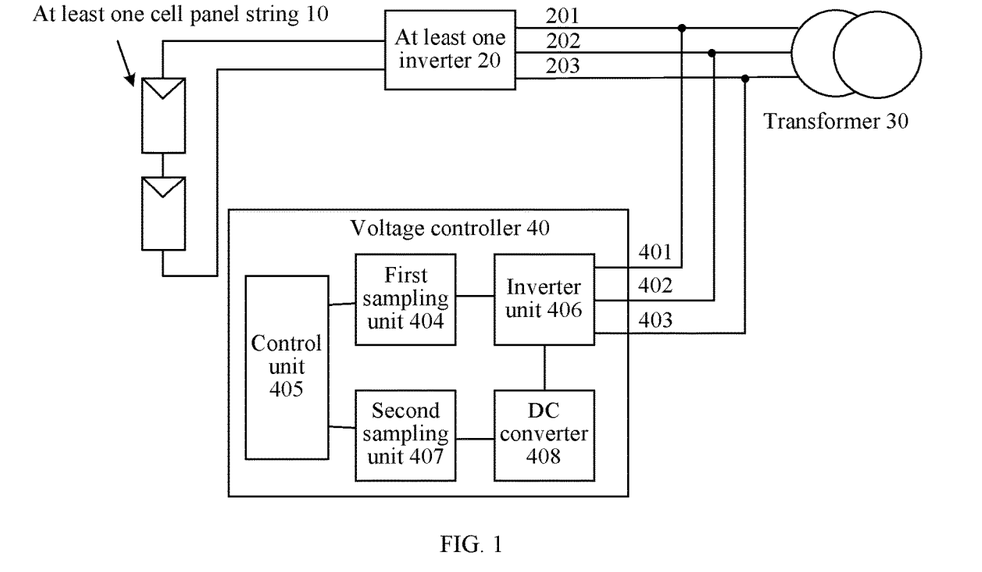
FIG. 1 is a schematic block diagram of a power supply system according to an embodiment of this application.

FIG. 1 is a schematic block diagram of a power supply system according to an embodiment of this application. As shown in FIG. 1, the power supply system includes at least one cell panel string 10, at least one inverter 20, a transformer 30, and a voltage controller 40.

An input end of the at least one inverter 20 is connected to an output end of the at least one cell string 10, an output end of the at least one inverter 20 is connected to an input end of the transformer 30, and an output end of the transformer 30 is configured to output a power supply voltage.

The voltage controller 40 includes a first sampling unit 404, a control unit 405 connected to the first sampling unit 404, and an inverter unit 406 connected to the first sampling unit 404. The first sampling unit 404 is configured to sample a voltage and a current of the inverter unit.

The output end of the at least one inverter 20 is further connected to an output end of the inverter unit 406.

The voltage controller 40 further includes a DC converter 408 configured to output a DC converted voltage; and the second sampling unit 407, connected to the control unit 405, and configured to sample a voltage and a current of the DC converter 408.

The control unit 405 is further configured to adjust a bus voltage of the inverter unit 406 and an input and/or output voltage of the DC converter 408 such that a voltage to earth output by the voltage controller 40 is continuously adjusted starting from 0.

Optionally, the voltage controller 40 further includes a first terminal 401, a second terminal 402, and a third terminal 403. One end of the first terminal 401 is connected to a first output end of the inverter unit 406, and the other end of the first terminal 401 is connected to a first output end of the at least one inverter 20. One end of the second terminal 402 is connected to a second output end of the inverter unit 406, and the other end of the second terminal 402 is connected to a second output end of the at least one inverter 20. One end of the third terminal 403 is connected to a third output end of the inverter unit 406, and the other end of the third terminal 403 is connected to a third output end of the at least one inverter 20.

Further, a minimum value of the voltage to earth output by the voltage controller is an uncontrolled rectified half-bus voltage of the inverter unit 406. At a moment in which the voltage controller 40 starts working, the cell panel string has parasitic capacitance to earth, generating a surge current. The surge current reaches a side of the cell panel string through the inverter. The surge current flowing through the inverter may result in shutdown of the inverter, affecting power generation. After the DC converter 408 is added to the voltage controller 40, the bus voltage of the inverter unit 406 and the input and/or output voltage of the DC converter 408 may be adjusted such that the voltage to earth output by the voltage controller 40 is adjusted starting from 0.

It should be understood that the at least one cell panel string may be one or more cell panel strings of a same type, for example, one or more P-type cell panel strings or one or more N-type cell panel strings, or may be one or more cell panel strings of different types.

Figure 2:
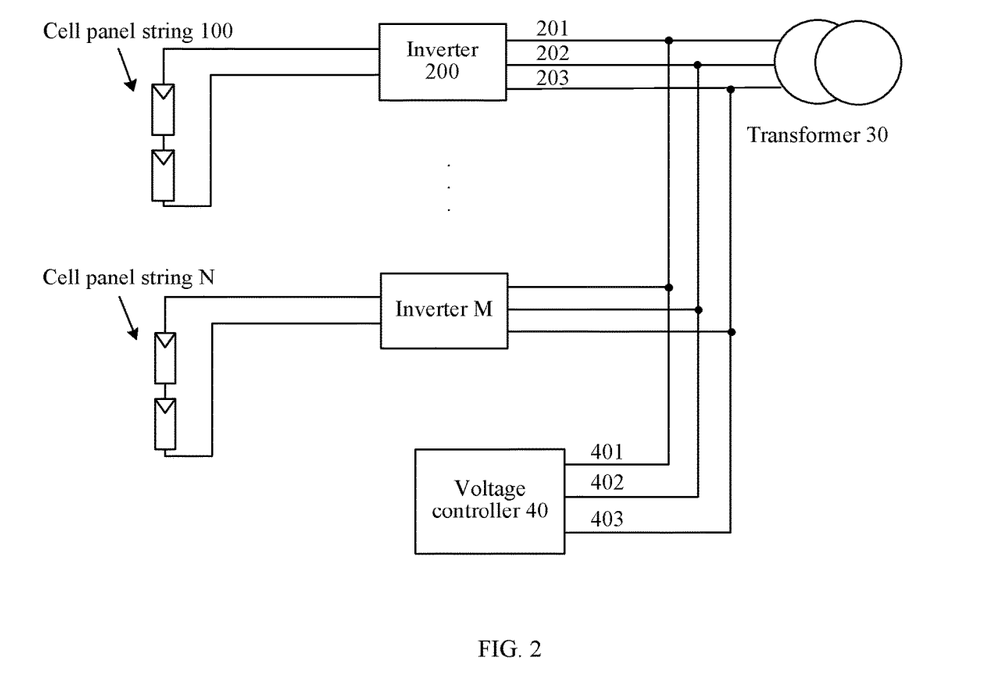
FIG. 2 is another schematic block diagram of a power supply system according to an embodiment of this application.

It should be further understood that if a plurality of cell panel strings exist in a power grid system, the plurality of cell panel strings correspond to a plurality of inverters, and the plurality of inverters are connected in parallel, as shown in FIG. 2.

Figure 3:
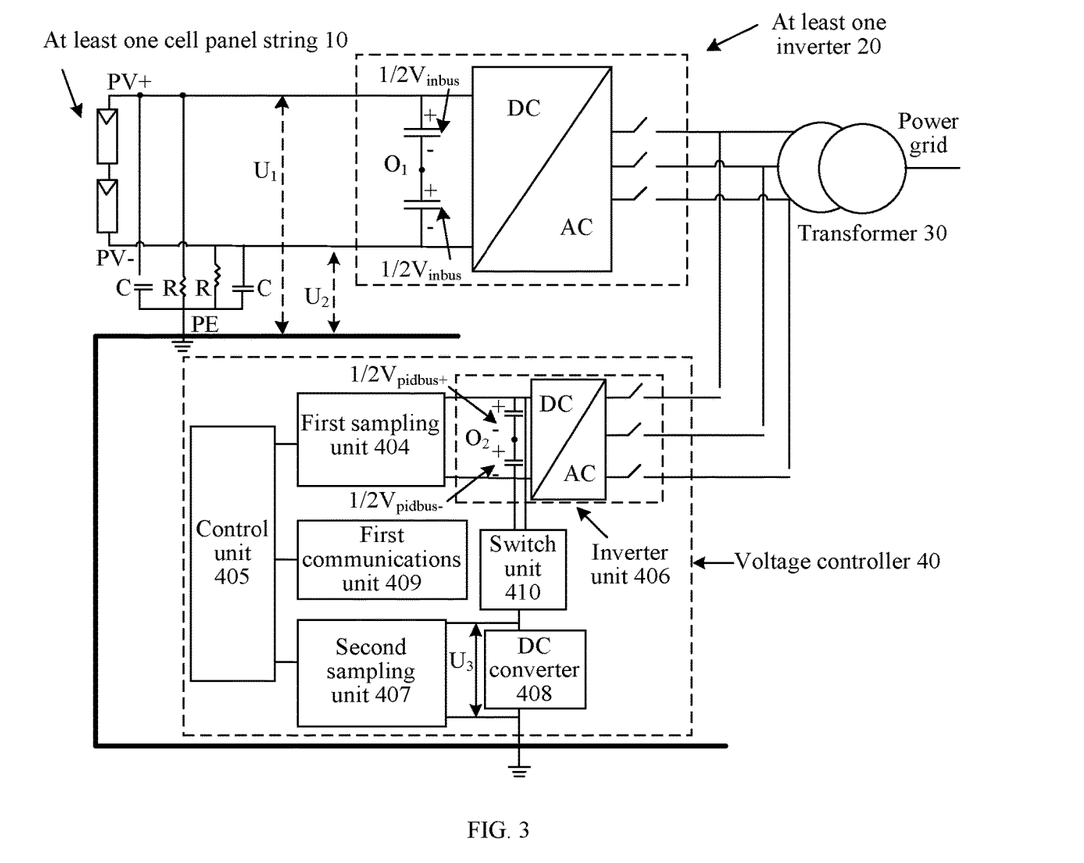
FIG. 3 is still another schematic block diagram of a power supply system according to an embodiment of this application.

For example, FIG. 3 shows another schematic block diagram of the power supply system according to this embodiment of this application. As shown in FIG. 3, a negative bus voltage of the inverter unit 406 in the voltage controller 40 is −150 volts. If there is no DC converter 408, at a moment in which the voltage controller starts working, the cell panel string has parasitic capacitance to earth, generating a surge current, resulting in shutdown of the inverter. After the DC converter 408 is added, the output voltage of the DC converter 408 may be adjusted to 150 volts such that the voltage to earth output by the voltage controller 40 is continuously adjusted starting from 0.

In the power supply system in this embodiment of this application, by adjusting a bus voltage of the voltage controller and the output voltage of the DC converter, the voltage to earth of the voltage controller is adjusted starting from 0, and an adjustable dead zone ranging from 0 to a half of an uncontrolled rectified voltage of a power grid voltage is compensated such that a range for voltage compensation is increased.

It should be understood that the power supply system in this embodiment of this application may be used in an inverter system having 1-stage conversion (including only a direct current (DC)/an alternating current (AC)), and may also be used in an inverter system having 2-stage conversion (including a boost circuit and a DC/an AC). This application is not limited thereto.

It should also be understood that the inverter unit 406 may be a 2-level inverter circuit, or may be a 3-level inverter circuit, or may be another multi-level inverter circuit. This application is not limited thereto.

It should also be understood that the DC converter may be a switch mode power supply, for example, a forward switch mode power supply or a flyback switch mode power supply. This application is not limited thereto.

As shown in FIG. 3, the voltage controller 40 further includes a first communications unit 409 configured to obtain a voltage to earth of the at least one cell panel string 10, where the control unit 405 is further configured to adjust the bus voltage of the inverter unit 406 and the output voltage of the DC converter 408 based on the voltage to earth of the at least one cell panel string 10 such that the voltage controller 40 adjusts a voltage to earth of a negative electrode of the at least one cell panel string to 0 volts or higher or adjusts a voltage to earth of a positive electrode of the at least one cell panel string to 0 volts or lower.

Optionally, the first communications unit is further configured to obtain the voltage to earth of the at least one cell panel string and a bus voltage of the at least one inverter; and the control unit is further configured to adjust the bus voltage of the inverter unit and the input and/or output voltage of the DC converter based on the voltage to earth of the at least one cell panel string and the bus voltage of the at least one inverter such that the voltage controller adjusts the voltage to earth of the negative electrode of the at least one cell panel string to 0 volts or higher or adjusts the voltage to earth of the positive electrode of the at least one cell panel string to 0 volts or lower.

In the power supply system in this embodiment of this application, by obtaining the voltage to earth of the cell panel string, the bus voltage of the inverter unit of the voltage controller and the output voltage of the DC converter are adjusted, to avoid PID.

Optionally, the voltage controller 40 further includes a switching unit 410 configured to switch adjustment of the voltage to earth of the positive electrode or the negative electrode of the at least one cell panel string, where the control unit 405 is further configured to select, based on a type of the at least one cell panel string, a positive bus or a negative bus of the inverter unit 406 to connect to the switching unit 410.

It should be understood that the switching unit in this embodiment of this application may be a relay, or may be a metal-oxide-semiconductor (MOS) transistor, or may be an insulated gate bipolar transistor (IGBT). This application is not limited thereto.

In the power supply system in this embodiment of this application, voltages to earth of different cell panel strings are adjusted using the switching unit such that the voltage controller adjusts the voltage to earth of the negative electrode of the at least one cell panel string to 0 volts or higher or adjusts the voltage to earth of the positive electrode of the at least one cell panel string to 0 volts or lower.

It should be understood that in a stable power supply system, a voltage of a neutral point of a power grid side, a voltage of a neutral point of an inverter AC side, and a voltage of a neutral point of the cell panel string are the same. The neutral point is a reference point of all voltage values in the power supply system. For example, when a power supply voltage of the power grid is a 220-volt AC voltage, a reference point of the 220-volt AC voltage is earth. That is, usually, the neutral point of the power supply system is earth, and a voltage of the neutral point is 0 volts.

For another example, in a common power supply system, it is assumed that a DC voltage between a positive electrode and a negative electrode of a P-type cell panel string is 800 volts. In the power supply system, a voltage of a neutral point is 0 volts, a voltage of a positive electrode of the P-type cell panel string is 400 volts, and a voltage of a negative electrode is −400 volts. Therefore, the negative electrode of the cell panel string has a −400-volt negative voltage to earth, causing power degradation of the cell panel string, and causing PID.

For ease of description, electric potential of a virtual N point is introduced on a low voltage side of the transformer.

Further, when the at least one inverter 20 normally works, relative to earth called protective earth (PE), the electric potential of the N point is equal to that of a bus midpoint $O_1$ of the at least one inverter 20. In this case, an N/PE voltage is an $O_1$/PE voltage, and is equal to a half-bus voltage ½ $V_{inbus}$ of the at least one inverter 20 plus a voltage $U_2$ of PV− relative to PE. An expression of $U_2$ is:

$$U_2 = V_{O1/PE} - \tfrac{1}{2} V_{inbus} \quad (1)$$

The $O_1$/PE voltage is further equal to a voltage $U_1$ to PE of PV+ minus the half-bus voltage ½ $V_{inbus}$ of the at least one inverter 20. An expression of $U_1$ is:

$$U_1 = V_{O1/PE} + \tfrac{1}{2} V_{inbus} \quad (2)$$

When the inverter unit 406 in the voltage controller 40 normally works, relative to the earth PE, the electric potential of the N point is equal to that of a bus midpoint $O_2$ of the voltage controller 40. In this case, the N/PE voltage is an $O_2$/PE voltage. When the negative bus of the voltage controller 40 is grounded using a series connection between the switching unit 410 and the DC converter 408, a voltage to earth of the bus midpoint $O_2$ is equal to the output voltage of the DC converter 408 plus the negative bus voltage ½ $V_{pidbus-}$ of the voltage controller 40, namely:

$$V_{O2/PE} = U_3 \tfrac{1}{2} V_{pidbus-} \quad (3)$$

When the positive bus of the voltage controller 40 is grounded using a series connection between the switching unit 410 and the DC converter 408, the voltage to earth of the bus midpoint $O_2$ is equal to the output voltage of the DC converter 408 minus the positive bus voltage ½ $V_{pidbus+}$ of the voltage controller 40, namely:

$$V_{O2/PE} = U_3 - \tfrac{1}{2} V_{pidbus+} \quad (4)$$

When the at least one inverter 20 and the voltage controller 40 normally work, electric potential of the bus midpoint $O_1$ of the at least one inverter is equal to that of the bus midpoint $O_2$ of the voltage controller 40, namely:

$$V_{O1/PE} = V_{O2/PE} \quad (5)$$

The formula (3) is substituted into the formula (1), to obtain a voltage to earth of PV− of the at least one cell panel string 10:

$$U_2 = U_3 \tfrac{1}{2} V_{pidbus-} - \tfrac{1}{2} V_{inbus} \quad (6)$$

The formula (4) is substituted into the formula (2), to obtain a voltage to earth of PV+ of the at least one cell panel string 10:

$$U_1 = U_3 - \tfrac{1}{2} V_{pidbus+} + \tfrac{1}{2} V_{inbus} \quad (7)$$

Further, after the at least one inverter 40 is grid-connected for working, the voltage controller 40 or another external monitoring system detects input voltages to earth $U_1$ and $U_2$ of the inverter and the half-bus voltage ½ $V_{inbus}$ of the at least one inverter, and transmits the signal to the voltage controller 40 for voltage compensation. During the compensation, the output voltage $U_3$ of the DC converter 408 and the positive bus voltage ½ $V_{pidbus+}$ and the negative bus voltage ½ $V_{pidbus-}$ of the inverter unit 406 in the voltage controller 40 are further adjusted, to control amplitudes of $U_1$ and $U_2$ such that the voltage controller 40 adjusts the voltage to earth of the negative electrode of the P-type cell panel string to 0 volts or higher and/or adjusts the voltage to earth of the positive electrode of the N-type cell panel string to 0 volts or lower.

For example, if compensation is performed on the voltage to earth of the P-type cell panel string, when the at least one inverter 20 and the voltage controller 40 normally work, the voltage controller 40 obtains that the voltage to earth $U_2$ of the negative electrode of the P-type cell panel string is −400 volts, and the half-bus voltage ½ $V_{inbus}$ of the at least one inverter 20 is −300 volts. In this case, if there is no output voltage $U_3$ of the DC converter 408, a minimum of the negative bus voltage ½ $V_{pidbus-}$ of the voltage controller 40 is a half of an uncontrolled rectified bus voltage of a power grid voltage, namely, −150 volts, and a starting compensation point of $U_2$ is a difference between ½ $V_{pidbus-}$ and ½ $V_{inbus}$, namely, 150 volts. Therefore, the voltage to earth $U_2$ of the negative electrode of the P-type cell panel string cannot be compensated starting from 0. In this embodiment of this application, after the DC converter 408 is added, the output voltage $U_3$ of the DC converter 408 may be adjusted, for example, $U_3$ is adjusted to −150 volts, and based on the formula (6), the voltage to earth $U_2$ of the negative electrode of the P-type cell panel string is adjusted to 0 volts.

For another example, if compensation is performed on the voltage to earth of the P-type cell panel string, when the at least one inverter 20 and the voltage controller 40 normally work, the voltage controller 40 obtains that the voltage to earth $U_2$ of the negative electrode of the P-type cell panel string is −400 volts, and the half-bus voltage ½ $V_{inbus}$ of the at least one inverter 20 is −300 volts. In this case, the output voltage $U_3$ of the DC converter 408 may be adjusted, for example, $U_3$ is adjusted to −100 volts, and ½ $V_{inbus}$ is adjusted to −200 volts such that the voltage to earth $U_2$ of the negative electrode of the P-type cell panel string is adjusted to 0 volts.

In the power supply system in this embodiment of this application, the positive bus and the negative bus of the voltage controller are grounded using the switching unit and the DC converter, to adjust the voltage to earth of the positive electrode or the negative electrode of the cell panel string. In addition, by adjusting the output voltage of the DC converter and the bus voltage of the inverter unit, the voltage to earth of the negative electrode of the at least one cell panel string is adjusted to 0 volts or higher or the voltage to earth of the positive electrode of the at least one cell panel string is adjusted to 0 volts or lower.

It should be understood that if the power supply system includes only a same type of cell panel string, the power supply system may not include the switching unit, and the positive bus or the negative bus of the inverter unit of the voltage controller is directly grounded using the DC converter.

Figure 4:
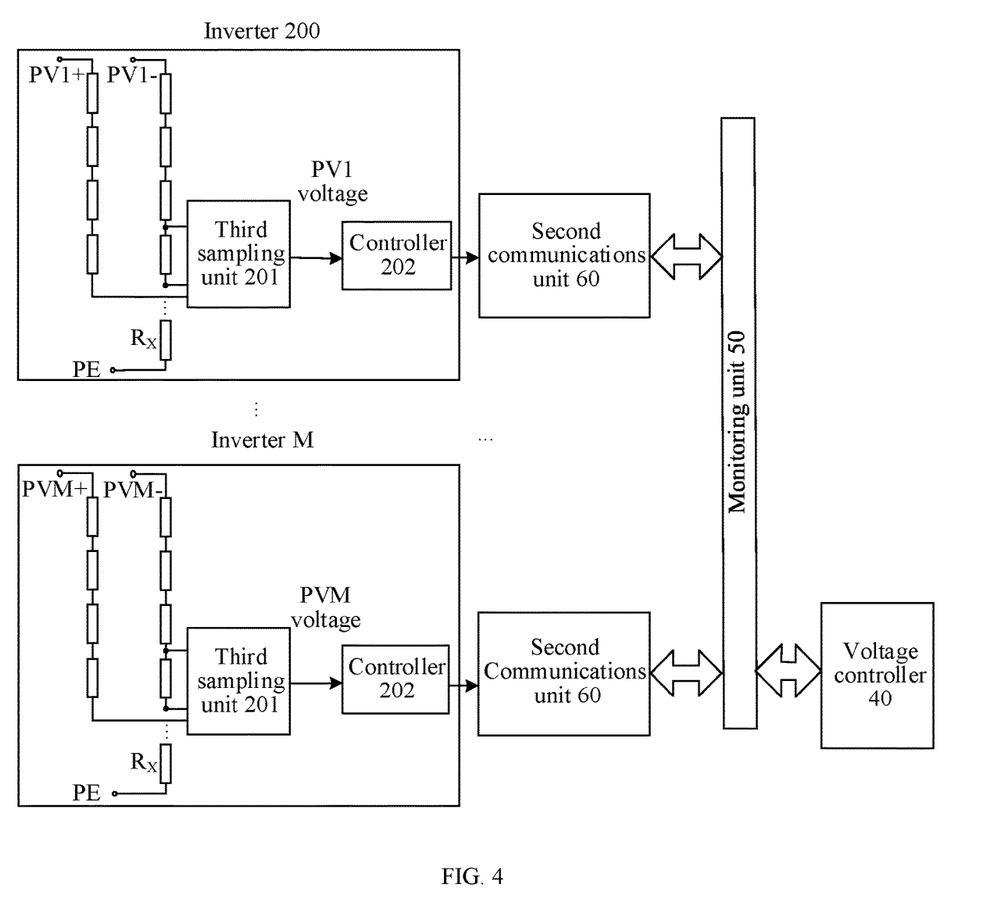
FIG. 4 is still another schematic block diagram of a power supply system according to an embodiment of this application.

Optionally, as shown in FIG. 4, the at least one inverter 20 includes a third sampling unit 201. The third sampling unit 201 is configured to sample a voltage to earth value of a cell panel string connected to the input end of the at least one inverter 20. The power supply system further includes a monitoring unit 50, connected to the at least one inverter 20 and the voltage controller 50, and configured to receive the voltage to earth value sent by the at least one inverter 20 and send the voltage to earth value to the voltage controller such that the voltage controller 40 continuously adjusts the voltage to earth value of the at least one cell panel string 10 starting from 0.

Optionally, the third sampling unit is further configured to sample the voltage to earth value of the cell panel string connected to the input end of the at least one inverter and a bus voltage value of the at least one inverter; and the monitoring unit is further configured to receive the voltage to earth value and the bus voltage value that are sent by the at least one inverter; and the monitoring unit is further configured to send the voltage to earth value and the bus voltage value to the voltage controller.

Optionally, the power supply system further includes a second communications unit 60 configured to send the voltage to earth value to the monitoring unit 50.

In an embodiment, the at least one inverter 20 samples a voltage to earth value of PV using the third sampling unit 201, and communicates with an external monitoring system using the second communications unit 60 to report a voltage to earth value of PV of each inverter. Alternatively, the monitoring unit 50 queries a voltage to earth value of PV of each inverter. The monitoring unit 50 transmits the voltage value to the voltage controller 40 through communication. The voltage controller adjusts the bus voltage $V_{pidbus}$ and the output voltage $U_3$ of the DC converter 408 based on the voltage to earth of each inverter such that the voltage controller 40 separately adjusts the voltage to earth of the negative electrode of the at least one cell panel string to 0 volts or higher or adjusts the voltage to earth value of the positive electrode of the at least one cell panel string to 0 volts or lower.

Optionally, as shown in FIG. 4, the at least one inverter 20 further includes a controller 202 configured to control an output voltage/output current of the at least one inverter.

It should be understood that the at least one inverter 20 may be one inverter, or may be a plurality of inverters. If the at least one inverter 20 is a plurality of inverters, for example, an inverter 200 to an inverter M, the plurality of inverters are connected in parallel.

It should also be understood that the second communications unit 60 shown in FIG. 4 is only an example of a communications mode. The second communications unit 60 may be an integrated PLC communications apparatus, or may be implemented in another wired or wireless communications mode. Alternatively, the at least one inverter 20 may directly communicate with the voltage controller 40, or the voltage controller 40 controls the voltage to earth of PV of the inverter by directly sampling and testing the voltage to earth of a PV end of the inverter.

In the power supply system in this embodiment of this application, when a plurality of inverters work in parallel, provided that a voltage to earth control apparatus is added to an AC grid-tied end, the voltage to earth of the negative electrode of the at least one cell panel string input into each inverter is adjusted to 0 volts or higher or the voltage to earth of the positive electrode of the at least one cell panel string input into each inverter is adjusted to 0 volts or lower.

Optionally, the control unit 405 is further configured to limit the output current of the inverter unit 406.

Optionally, the control unit 405 is further configured to, if an output power of the at least one inverter 20 is greater than or is equal to a first power threshold, limit the output current of the voltage controller 40 to be less than or equal to a first current threshold; or if an output power of the at least one inverter 20 is less than a first power threshold, limit the output current of the voltage controller to be less than or equal to a second current threshold, where the first current threshold is greater than or equal to the second current threshold.

Further, in the power supply system in this embodiment of this application, as shown in FIG. 3, when a human body touches a PV+ line (or insulation to earth of a wire is damaged) and a grounding fault occurs, a branch of a fault circuit is a loop sequentially including the voltage controller 40, the at least one inverter 20, the PV+ line, the human body, and protective earth PE. A ground fault current that is in the system and that flows through the human body (or a fault source) is provided by the external voltage controller 40. A value of the fault current may be controlled by limiting the output current of the voltage controller 40, to reduce a hazard of an electrical shock. A specified value of the output current may be set based on a capacity of a photovoltaic inverter. For example, for an inverter having a rated output less than or equal to 30 kilo Volt-Amps (kVA), the output current of the voltage controller 40 is controlled to be less than or equal to 300 mA; or for an inverter having a rated output greater than 30 kVA, the output current of the voltage controller 40 is controlled to be less than or equal to 10 mA/kVA.

Optionally, the at least one inverter 20 further includes a current protection unit configured to establish or end a connection between the at least one inverter 20 and the transformer 30, where if a value of a current passing through the current protection unit is greater than or equal to a fault current threshold, the current protection unit ends the connection between the at least one inverter 20 and the transformer 30.

Further, the power supply system in this embodiment of this application may further work in cooperation with the inverter having the current protection unit. The ground fault current in the foregoing fault case flows through the current protection unit, triggering current protection. The inverter ends a connection between the inverter and the power grid using a breaking switch, and cuts the loop of the ground fault current, to ensure safety of the human body or a fault ground point.

In the power supply system in this embodiment of this application, the output current of the voltage control apparatus is limited such that a fault ground current of a photovoltaic inverter system is limited, and a hazard of an electrical shock is reduced. In addition, the voltage controller may further work together with the current protection unit of the inverter, to further eliminate the hazard of the electrical shock.

The power supply system in this embodiment of this application is described in detail with reference to FIG. 1 to FIG. 4. A power supply method in the embodiments of this application is described in detail below with reference to FIG. 5.

Figure 5:
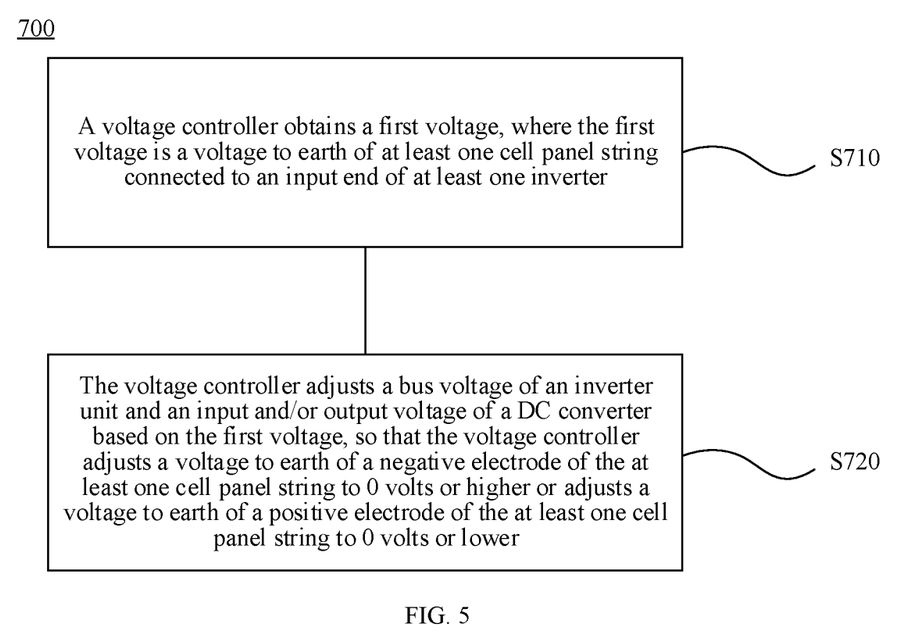
FIG. 5 is a schematic flowchart of a power supply method according to an embodiment of this application.

FIG. 5 is a schematic flowchart of a power supply method 700 according to an embodiment of this application. As shown in FIG. 5, the method 700 includes the following steps.

S710. The voltage controller obtains a first voltage, where the first voltage is a voltage to earth of at least one cell panel string connected to an input end of at least one inverter.

S720. The voltage controller adjusts a bus voltage of an inverter unit and an input and/or output voltage of a DC converter based on the first voltage such that the voltage controller adjusts a voltage to earth of a negative electrode of the at least one cell panel string to 0 volts or higher or adjusts a voltage to earth of a positive electrode of the at least one cell panel string to 0 volts or lower.

Optionally, the voltage controller obtains the first voltage and a second voltage, where the first voltage is the voltage to earth of the at least one cell panel string connected to the input end of the at least one inverter, and the second voltage is a bus voltage of the at least one inverter; and the voltage controller adjusts the bus voltage of the inverter unit and the input and/or output voltage of the DC converter based on the first voltage and the second voltage such that the voltage controller adjusts the voltage to earth of the negative electrode of the at least one cell panel string to 0 volts or higher or adjusts the voltage to earth of the positive electrode of the at least one cell panel string to 0 volts or lower.

In the power supply method in this embodiment of this application, by adjusting the input and/or output voltage of the DC converter and the bus voltage of the inverter unit, the voltage to earth output by the voltage controller is adjusted starting from 0, and an adjustable dead zone ranging from 0 to a half of an uncontrolled rectified voltage of a power grid voltage is compensated such that a range for voltage compensation is increased. In addition, by adjusting the input and/or output voltage of the DC converter and the bus voltage of the inverter unit, the voltage to earth of the negative electrode of the at least one cell panel string is adjusted to 0 volts or higher or the voltage to earth of the positive electrode of the at least one cell panel string is adjusted to 0 volts or lower.

Optionally, the method further includes switching, by the voltage controller, adjustment of the voltage to earth of the positive electrode or the negative electrode of the at least one cell panel string.

Optionally, the power supply method further includes selecting, based on a type of the at least one cell panel string, a positive bus or a negative bus of the inverter unit to connect to the switching unit.

In the power supply method in this embodiment of this application, voltages to earth of positive electrodes or negative electrodes of different cell panel strings are adjusted such that the voltage controller adjusts the voltage to earth of the negative electrode of the at least one cell panel string to 0 volts or higher or adjusts the voltage to earth of at least one positive cell panel string to 0 volts or lower.

Optionally, the power supply method further includes obtaining, by the voltage controller, the voltage to earth of the negative electrode of the at least one cell panel string; and adjusting, by the voltage controller, the bus voltage of the inverter unit and the input and/or output voltage of the DC converter based on the voltage to earth of the negative electrode of the at least one cell panel string such that the voltage controller adjusts a voltage to earth value of the negative electrode of the at least one cell panel string to 0 volts or higher.

Optionally, the power supply method further includes obtaining, by the voltage controller, the voltage to earth of the negative electrode of the at least one cell panel string and a bus voltage of the inverter connected to an output end of the at least one cell panel string; and adjusting, by the voltage controller based on the voltage to earth of the negative electrode of the at least one cell panel string and the bus voltage of the inverter connected to the output end of the at least one cell panel string, the bus voltage of the inverter unit and the input and/or output voltage of the DC converter such that the voltage controller adjusts the voltage to earth value of the negative electrode of the at least one cell panel string to 0 volts or higher.

Optionally, the power supply method further includes obtaining, by the voltage controller, a voltage to earth of a positive electrode of the at least one cell panel string; and adjusting, by the voltage controller, the bus voltage of the inverter unit and the input and/or output voltage of the DC converter based on the voltage to earth of the positive electrode of the at least one cell panel string such that the voltage controller adjusts a voltage to earth value of the positive electrode of the at least one cell panel string to 0 volts or lower.

Optionally, the power supply method further includes obtaining, by the voltage controller, the voltage to earth of the positive electrode of the at least one cell panel string and a bus voltage of the inverter connected to an output end of the at least one cell panel string; and adjusting, by the voltage controller based on the voltage to earth of the positive electrode of the at least one cell panel string and the bus voltage of the inverter connected to the output end of the at least one cell panel string, the bus voltage of the inverter unit and the input and/or output voltage of the DC converter such that the voltage controller adjusts the voltage to earth value of the positive electrode of the at least one cell panel string to 0 volts or lower.

Optionally, the method further includes limiting, by the control unit, an output current of the voltage controller.

Optionally, the limiting an output current of the inverter unit includes, if an output power of the at least one inverter is greater than or is equal to a first power threshold, limiting the output current of the voltage controller to be less than or equal to a first current threshold; or if an output power of the at least one inverter is less than a first power threshold, limiting the output current of the voltage controller to be less than or equal to a second current threshold, where the first current threshold is greater than or equal to the second current threshold.

Optionally, the method further includes establishing or ending, by the current protection unit, a connection between the at least one inverter and the transformer, where if a value of a current passing through the current protection unit is greater than or equal to a fault current threshold, the current protection unit ends the connection between the at least one inverter and the transformer.

In the power supply method in this embodiment of this application, the output current of the voltage controller is limited such that a fault ground current of a photovoltaic inverter system is limited, and a hazard of an electrical shock is reduced. In addition, the voltage controller may further work together with the current protection unit of the inverter, to further eliminate the hazard of the electrical shock.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on requirements in an embodiment to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A power supply system, comprising:
a cell panel string;
a first inverter coupled to the cell panel string and comprising a first input end and a first output end;
a transformer coupled to the first inverter; and
a voltage controller coupled to the first inverter and comprising:
a direct current (DC) converter configured to output a DC converted voltage;
a second inverter coupled to the DC converter and comprising a second output end, wherein the second output end is coupled to the first output end; and
a controller coupled to the DC converter and the second inverter and configured to adjust a bus voltage of the second inverter and at least one of an input voltage of the DC converter or an output voltage from the DC converter such that the voltage controller continuously adjusts a first voltage to earth value of the voltage controller starting from 0 volts.

2. The power supply system of claim 1, wherein the cell panel string comprises a positive electrode and a negative electrode, wherein the voltage controller further comprises a first communicator coupled to the controller and configured to obtain a second voltage to earth value of the cell panel string, and wherein the controller is further configured to adjust the bus voltage and at least one of the input voltage of the DC converter or the DC converted voltage based on the second voltage to earth value such that the voltage controller adjusts a third voltage to earth value of the negative electrode to 0 volts or higher or adjusts a fourth voltage to earth value of the positive electrode to 0 volts or lower.

3. The power supply system of claim 2, wherein the voltage controller further comprises a switch coupled to the DC converter and the second inverter, wherein the switch is configured to switch adjustment of the fourth voltage to earth value of the positive electrode or the third voltage to earth output of the negative electrode, wherein the second inverter further comprises a positive bus and a negative bus, and wherein the controller is further configured to connect the positive bus or the negative bus to the switch.

4. The power supply system of claim 3, wherein the switch is at least one of a relay, a metal oxide semiconductor transistor, or an insulated gate bipolar transistor.

5. The power supply system of claim 2, wherein the controller is further configured to sample the second voltage to earth value at the first input end, wherein the power supply system further comprises a monitor coupled to the first inverter and the voltage controller, and wherein the power supply system is further configured to:
receive a fifth voltage to earth value from the first inverter; and
send a sixth voltage to earth value to the voltage controller.

6. The power supply system of claim 1, wherein the controller is further configured to limit at least one of an output current of the voltage controller or an input current of the voltage controller.

7. The power supply system of claim 6, wherein the controller is further configured to:
limit the output current of the voltage controller to be less than or equal to a first current threshold when an output power of the first inverter is greater than or equal to a first power threshold; or
limit the output current of the voltage controller to be less than or equal to a second current threshold when the output power of the first inverter is less than the first power threshold, wherein the first current threshold is greater than or equal to the second current threshold.

8. The power supply system of claim 1, wherein the first inverter further comprises a current protector configured to:
end a connection between the first inverter and the transformer; and
pass a value of a current through the current protector that is greater than or equal to a fault current threshold.

9. The power supply system of claim 1, wherein the DC converter is a switch mode power supply.

10. A power supply method for a power supply system and comprising:
obtaining, by a voltage controller, a first voltage or a second voltage, wherein the voltage controller comprises a first inverter, wherein the first voltage comprises a first voltage to earth value of a cell panel string, wherein the second voltage is a first bus voltage of a second inverter, wherein the cell panel string is coupled to an input end of the second inverter and comprises a negative electrode and a positive electrode, and wherein the power supply system comprises the cell panel string, the first inverter, a transformer, and the voltage controller; and adjusting, by the voltage controller, a second bus voltage of the first inverter and at least one of an input voltage of a direct current (DC) converter or an output voltage of the DC converter based on the first voltage or the second voltage such that the voltage controller adjusts a second voltage to earth value of the negative electrode to 0 volts or higher or adjusts a third voltage to earth value of the positive electrode to 0 volts or lower.

11. The power supply method of claim 10, further comprising switching, by the voltage controller, adjustment to the third voltage to earth value or the second voltage to earth value.

12. The power supply method of claim 11, further comprising:

establishing or ending, by a current protector, a connection between the second inverter and the transformer, wherein the first inverter comprises the current protector, wherein the current protector ends the connection between the second inverter and the transformer; and passing, through the current protector, a current that is greater than or equal to a fault current threshold.

13. The power supply method of claim 10, further comprising:

obtaining, by the voltage controller, the second voltage to earth value; and adjusting, by the voltage controller, the second bus voltage and either the input voltage or the output voltage based on the second voltage to earth value such that the voltage controller adjusts the second voltage to earth output to 0 volts or higher.

14. The power supply method of claim 10, further comprising:

obtaining, by the voltage controller, the third voltage to earth value; and adjusting, by the voltage controller, the second bus voltage and either the input voltage or the output voltage based on the third voltage to earth value such that the voltage controller adjusts the third voltage to earth value to 0 volts or lower.

15. The power supply method of claim 10, further comprising limiting, by a controller, an output current of the voltage controller, wherein the voltage controller comprises the controller.

16. The power supply method of claim 15, further comprising:

limiting the output current of the voltage controller to be less than or equal to a first current threshold when an output power of the second inverter is greater than or equal to a first power threshold; or limiting the output current of the voltage controller to be less than or equal to a second current threshold when the output power of at least one of the first or the second inverter is less than the first power threshold, wherein the first current threshold is greater than or equal to the second current threshold.

17. A computer program product comprising computer executable instructions stored on a non-transitory computer-readable medium that, when executed by a processor in a power supply system, cause the power supply system to:

obtain, a voltage controller, a first voltage or a second voltage, wherein the first voltage controller comprises a first inverter, wherein the first voltage comprises a first voltage to earth value of a cell panel string, wherein the second voltage is a first bus voltage of a second inverter, wherein the cell panel string is coupled to an input end of the second inverter and comprises a negative electrode and a positive electrode, and wherein the power supply system comprises the cell panel string, the first inverter, a transformer, and the voltage controller; and adjust, the voltage controller, a second bus voltage of the first inverter and at least one of an input voltage of a direct current (DC) converter or an output voltage of the DC converter based on the first voltage or the second voltage such that the voltage controller adjusts a second voltage to earth value of the negative electrode to 0 volts or higher or adjusts a third voltage to earth value of the positive electrode to 0 volts or lower.

18. The computer program product of claim 17, wherein the instructions further cause the power supply system to switch adjustment to the third voltage to earth value or the second voltage to earth value.

19. The computer program product of claim 17, wherein the instructions further cause the power supply system to:

obtain, by the voltage controller, the second voltage to earth value; and adjust, by the voltage controller, the second bus voltage and either the input voltage or the output voltage of the DC converter based on the second voltage to earth value such that the voltage controller adjusts the second voltage to earth value to 0 volts or higher.

20. The computer program product of claim 17, wherein the instructions further cause the power supply system to:

obtain, by the voltage controller, the third voltage to earth value; and adjust, by the voltage controller, the second bus voltage and either the input voltage or the output voltage of the DC converter based on the third voltage to earth value such that the voltage controller adjusts the third voltage to earth value to 0 volts or lower.

\* \* \* \* \*

UNITED STATES PATENT AND TRADEMARK OFFICE
CERTIFICATE OF CORRECTION

PATENT NO. : 11,011,999 B2  
APPLICATION NO. : 16/881796  
DATED : May 18, 2021  
INVENTOR(S) : Yongbing Gao, Yanfeng Li and Xun Wang Page 1 of 1

It is certified that error appears in the above-identified patent and that said Letters Patent is hereby corrected as shown below:

In the Claims

Claim 17, Column 18, Line 13: "obtain, a voltage" should read "obtain, by a voltage"

Signed and Sealed this
Twenty-ninth Day of June, 2021

Drew Hirshfeld
*Performing the Functions and Duties of the*
*Under Secretary of Commerce for Intellectual Property and*
*Director of the United States Patent and Trademark Office*